United States Patent [19]

Bock et al.

[11] 4,305,203

[45] Dec. 15, 1981

[54] TOOL FOR INSTALLING SHRINK FIT PARTS

[75] Inventors: Miriam S. Bock, San Diego; Gerald D. Peddie, Bonita, both of Calif.

[73] Assignee: General Dynamics, Convair Division, San Diego, Calif.

[21] Appl. No.: 113,181

[22] Filed: Jan. 18, 1980

[51] Int. Cl.³ .................... B23P 19/00; F25D 19/00
[52] U.S. Cl. ........................................ 29/800; 29/447; 62/298
[58] Field of Search ................ 29/447, 800; 62/1, 298

[56] References Cited

U.S. PATENT DOCUMENTS

| | | | |
|---|---|---|---|
| 1,955,728 | 4/1934 | Allen et al. | 29/447 UX |
| 2,038,592 | 4/1936 | Morris | 29/447 UX |
| 2,259,841 | 10/1941 | Spiegl | 62/1 |
| 3,724,059 | 4/1973 | Celovsky | 29/800 X |
| 3,872,573 | 3/1975 | Nichols et al. | 29/447 |

Primary Examiner—Charlie T. Moon
Attorney, Agent, or Firm—John R. Duncan; Frank D. Gilliam

[57] ABSTRACT

A tool for installing shrink fit parts formed of a material which is dimensionally stable over a wide range of temperatures having a locating surface on which a part to be shrunk is clamped and having a chamber adjacent the locating surface, which is filled with a cooling media as the part is being shrunk in a source or vat of cooling media, to maintain the part in its shrunken condition after removal from the cooling media. A valve is provided for removing the cooling media from the chamber after the shrunken part is positioned precisely in a second part so that the shrunken part will warm and expand into the second part to form a shrink fit therewith.

Also disclosed is a method comprising, positioning a part to be shrunk adjacent a chamber, filling the chamber with a cooling media as the part is being shrunk, maintaining the cooling media adjacent the part while the part is fitted into a second part, thereafter removing the cooling media from the chamber thus allowing the part to expand into the second part to provide a shrink fit therewith and thereafter removing the chamber from the two parts.

7 Claims, 10 Drawing Figures

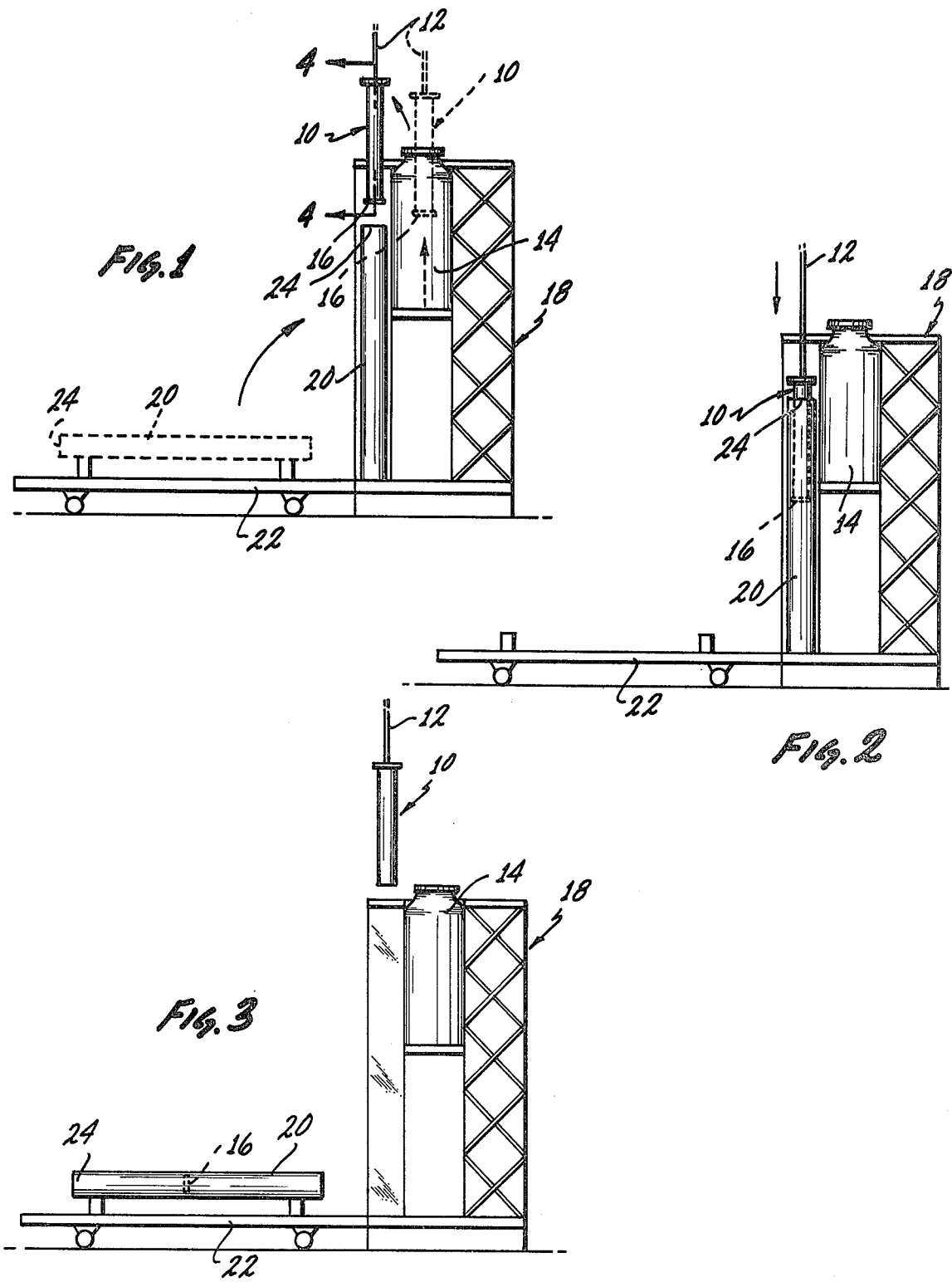

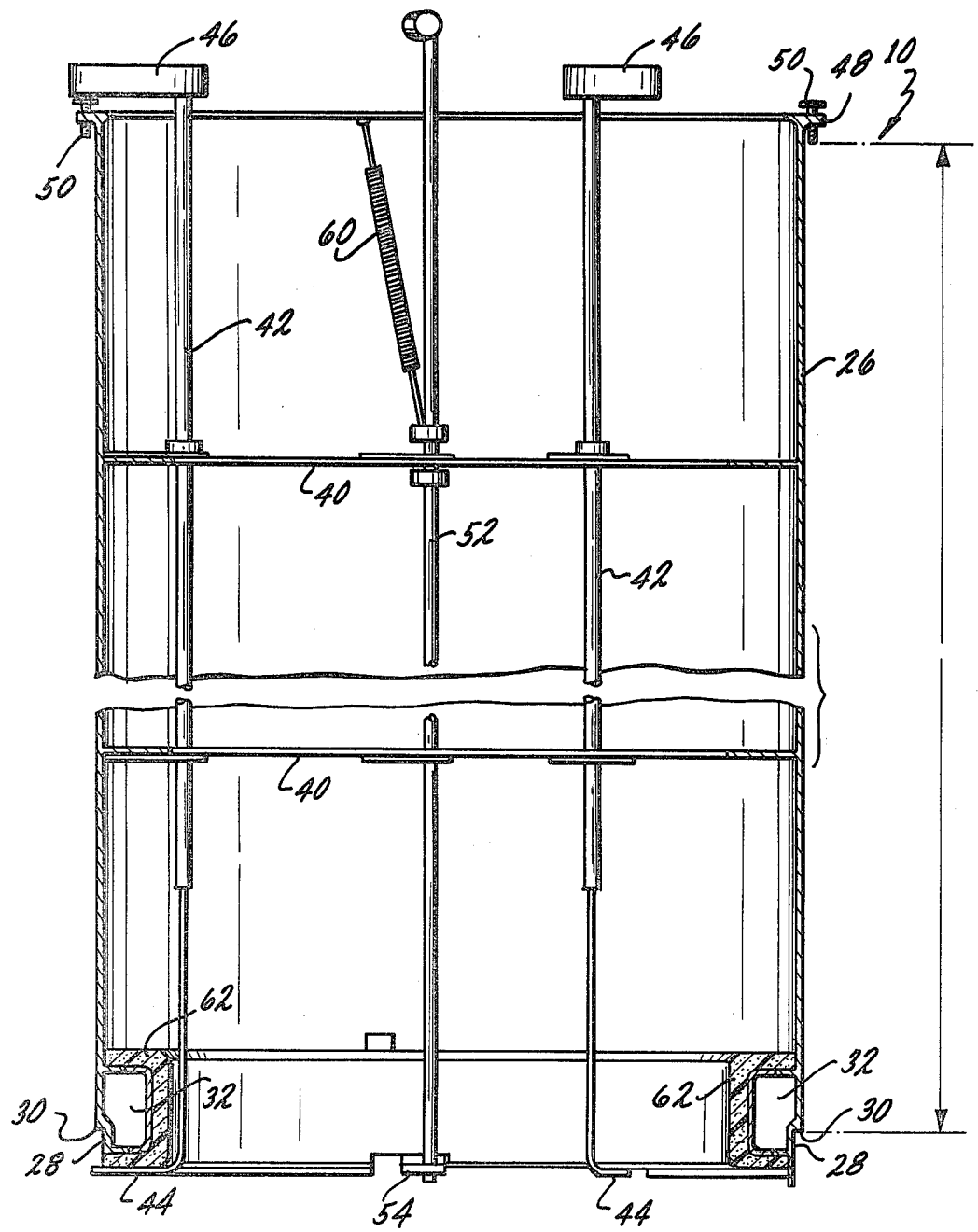

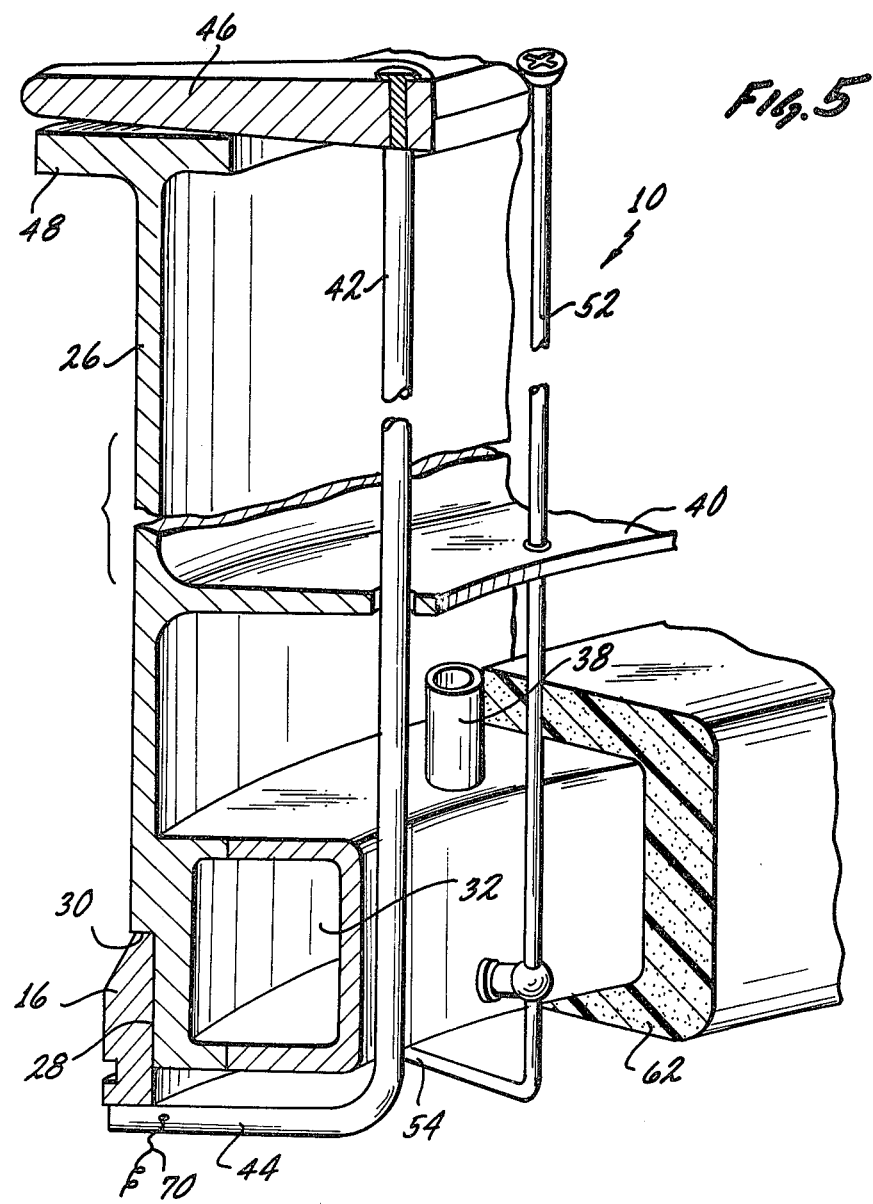

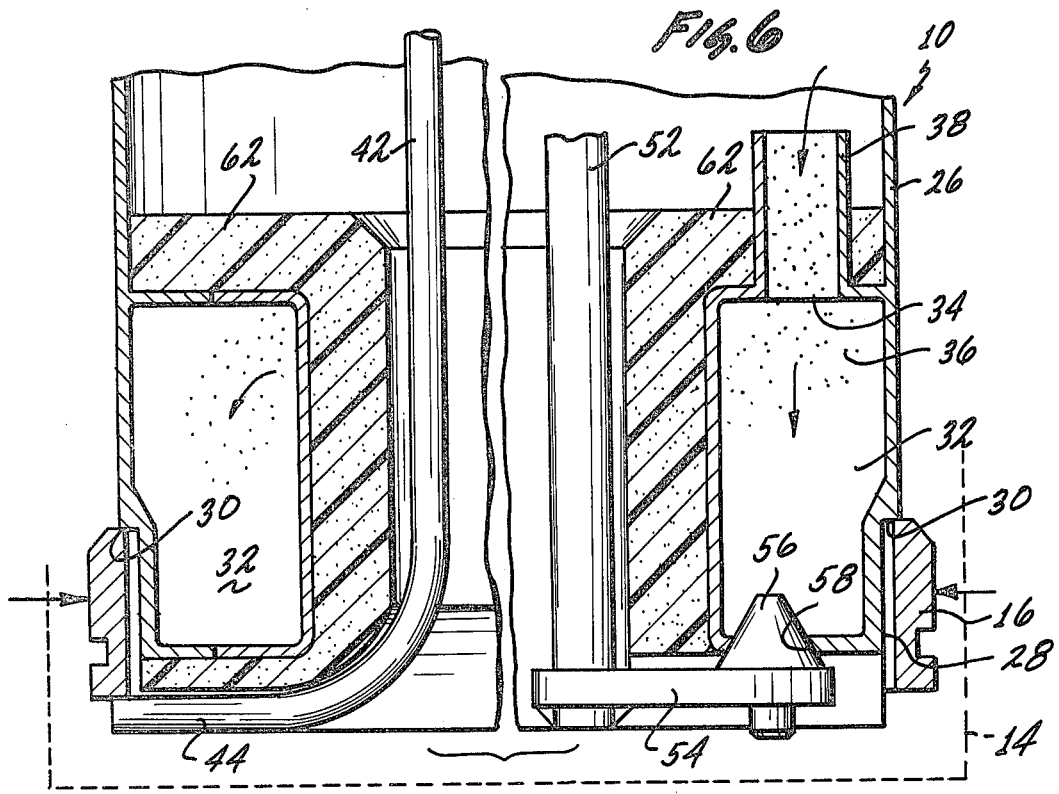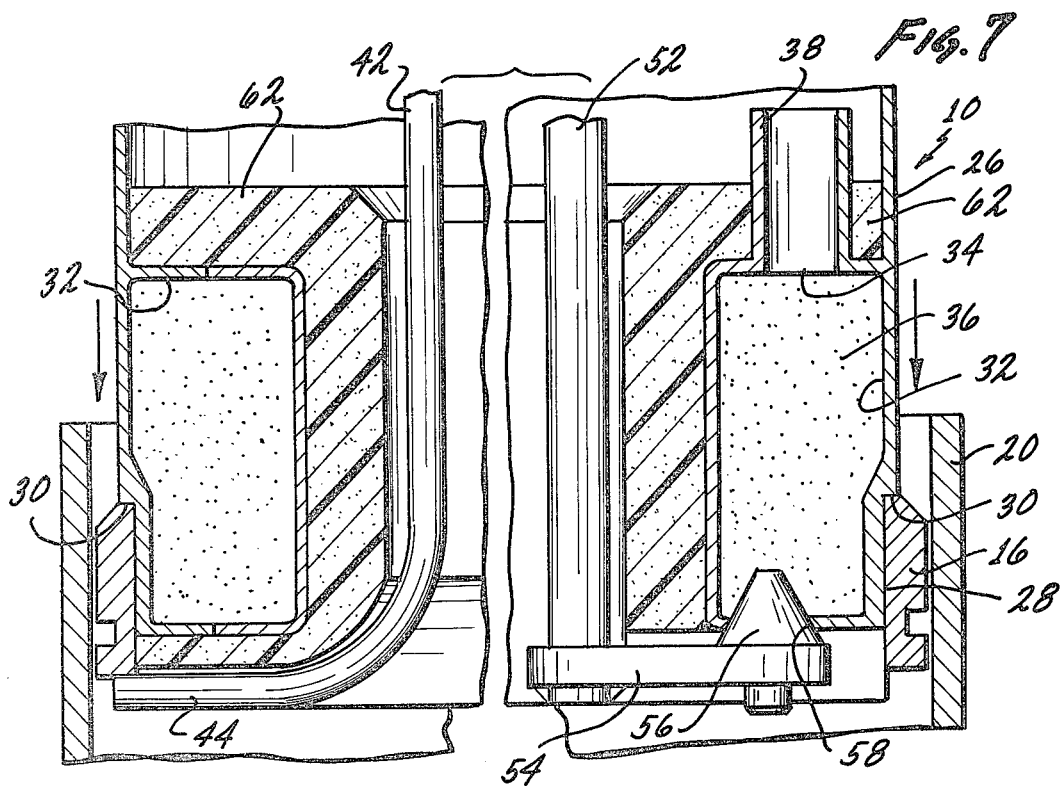

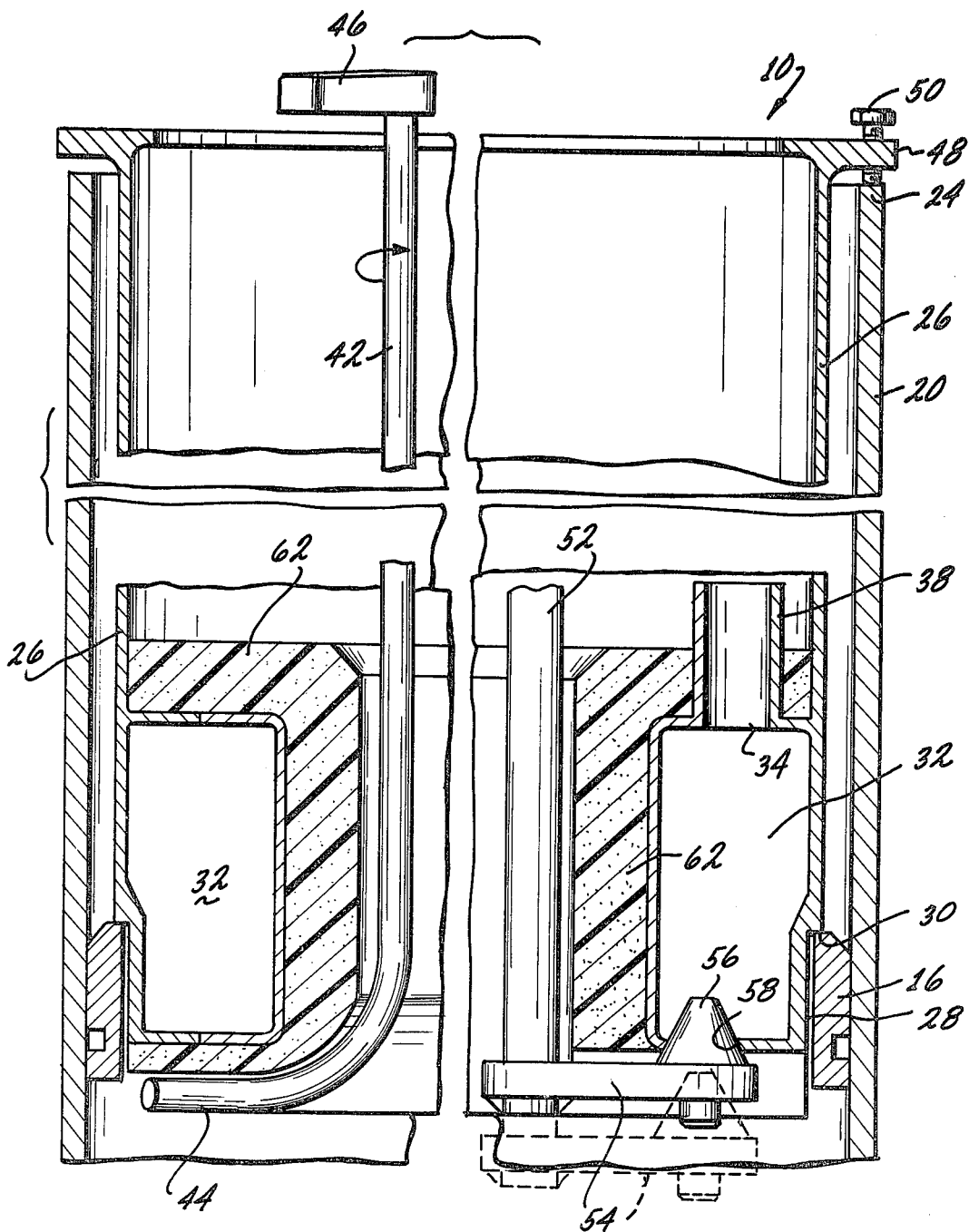

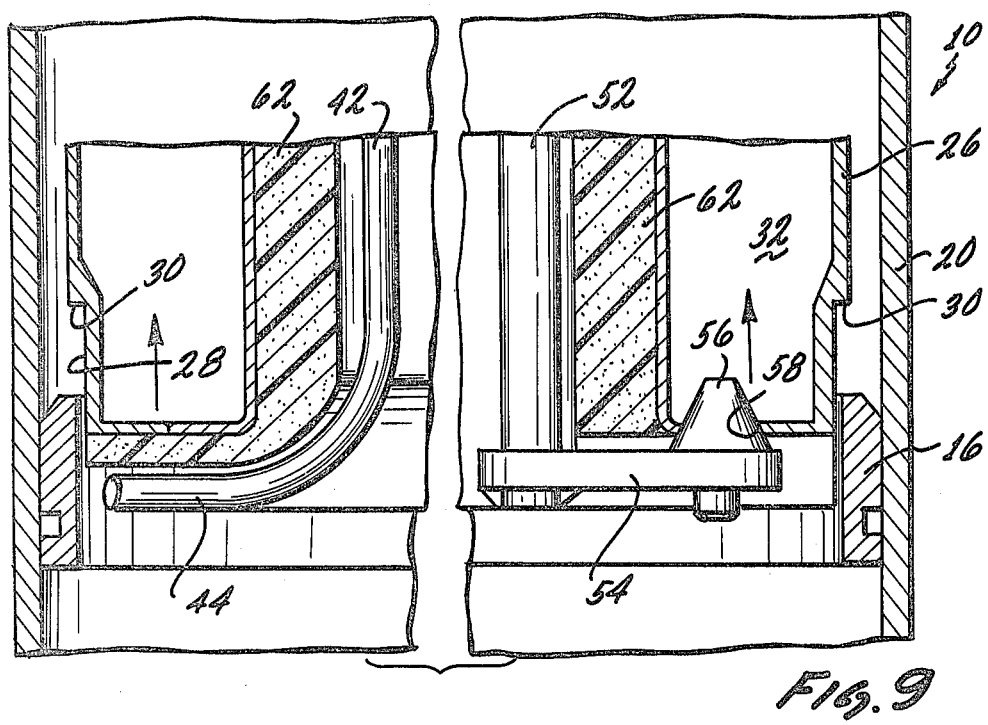
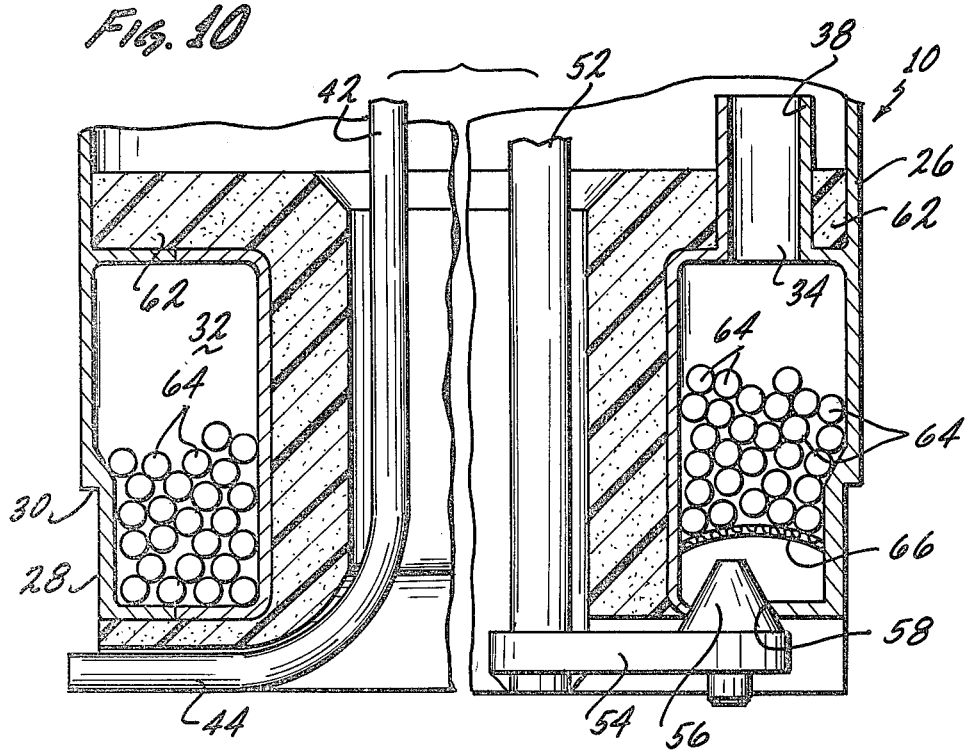

TOOL FOR INSTALLING SHRINK FIT PARTS

BACKGROUND OF THE INVENTION

This invention relates to a tool for installing shrink fit parts and a method therefor.

Where there is a need to fit one part into another for a very tight relationship between the two, it is common practice to shrink one part before installing it in the second part and allowing the second part to expand against the second part to form a so-called shrink fit there between.

To shrink fit a part into another is difficult because of the inability to maintain the shrunken part in such a condition and thus maintain dimensional control of the part while positioning it precisely into the second part. It is one thing to shrink the part by applying a cooling media, such as liquid nitrogen, $LN_2$, and it is yet another thing to maintain the part in its shrunken condition while attempting to fit it into the second part. The shrunken part naturally tends to warm up and expand which makes the precise positioning of the two parts a difficult task.

It is, therefore, an object of this invention to provide a tool in which the part to be shrunk fit into another is held and continually subjected to a cooling media while precisely positioned in the second part so that dimensional control of the shrunken part and the tool is maintained until so positioned whereupon the cooling media is removed and the part warms and expands in place in the second part.

Still another object of this invention is to provide a method of installing a part in shrink fit relationship in another part by continually subjecting the part to be shrunk to a cooling media while the part is being installed in another part and removing the cooling media after installation so that the part is allowed to expand in place to form a shrink fit relationship with the second part.

SUMMARY OF THE INVENTION

The tool which meets the foregoing objects is formed of a material which is dimensionally stable over a wide range of temperatures having a locating surface on which a part to be shrunk, such as a sealing ring, is clamped and having a chamber adjacent the locating surface which is filled with a cooling media as the part is being shrunk in a source or vat of cooling media to maintain the part in its shrunken condition after removal from the vat of cooling media. A valve is provided for removing the cooling media from the chamber after the shrunken part is positioned precisely in a second part, such as a capsule, so that the shrunken part will warm and expand into the second part to form a shrink fit therewith. The dimensional stability of the tool also permits control of the dimension (position) of the sealing ring in relation to the end of the capsule in which the sealing ring is fitted.

The method which meets the foregoing object comprises positioning a part to be shrunk adjacent a chamber, filling the chamber with a cooling media as the part is being shrunk, maintaining the cooling media adjacent the part while the part is fitted into a second part, thereafter removing the cooling media from the chamber thus allowing the part to expand into the second part to provide a shrink fit therewith and thereafter removing the chamber from the two parts.

BRIEF DESCRIPTION OF THE DRAWINGS

FIGS. 1, 2 and 3 show a sequence of steps for inserting a shrink fit part into a second part; in this case, a sealing ring is to be fitted into a capsule;

FIG. 4 is a cross-sectional view of the tool, taken along line 4—4 of FIG. 1 and enlarged, but without the sealing ring, and showing the clamp in two positions;

FIG. 5 is a partial sectional view showing the details of the tool;

FIG. 6 is a partial sectional view showing the sealing ring immersed in a vat (shown schematically) and the details of the valve for opening and closing the torroidal chamber;

FIG. 7 is similar to FIG. 6 but showing the sealing ring entering into the end of the capsule;

FIG. 8 is similar to FIGS. 6 and 7 but showing the sealing ring in shrink fit relationship with the capsule and precisely positioned in relation to the end of the capsule;

FIG. 9 shows the sealing ring and capsule in final shrink fit relationship with the capsule and the tool being withdrawn; and FIG. 10 shows another embodiment of the tool using metal spheres to contain the low temperature in the torroidal chamber for a longer period of time.

BRIEF DESCRIPTION OF THE PREFERRED EMBODIMENT

In FIGS. 1, 2 and 3 of the drawings, there is shown a sequence of steps in the method of this invention utilizing the shrink fit tool 10 of this invention.

The tool 10 is shown in position suspended on a cable 12 and immersed in a vat or tank 14 of suitable liquid coolant, such as liquid nitrogen, $LN_2$ where the part 16 is cooled and shrunk in position on the tool. The vat is, in turn, supported on a relatively large supporting structure 18 which also supports a capsule 20 on a dolly 22. With the capsule 20 up-ended into the supporting structure (as indicated by the arrow) and suitably positioned, the tool 10 is lifted out of the vat (also indicated by the arrow) and positioned over the capsule where the part 16, the part to be fitted, is positioned relative to the open end 24 of the capsule (FIG. 1). At this time and while the part 16 is still shrunk and clamped on the tool, the tool is lowered in place into the capsule and held there until the shrunk part 16 is warmed up and expands into shrink fit relationship with the capsule 20 (FIG. 2) whereupon the tool is lifted out of the capsule (FIG. 3), fitted with another part to be shrunk and the tool is again lowered into the vat of liquid coolant. Thereafter, or comtemporaneously with the last mentioned step, the capsule is lowered onto the dolly 22.

Turning now to FIGS. 4 et seq, which shows the tool 10 and its operation in more detail, it can be seen that the tool 10 as having an elongated, thin-walled cylinder 26 of a material, such as graphite epoxy, which is dimensionally stable when subjected to temperature changes. The cylinder 26 is provided with a reduced portion 28 near one end of its external surface to form a guiding shoulder 30, which, in turn, forms a locating means for the part to be shrunk, such as sealing ring 16, when the ring is placed on the cylinder. The cylinder is also provided on its internal wall with a torroidal chamber 32, immediately opposite the reduced portion for maximum thermal conductivity between the chamber 32 and the ring 16. This chamber 32 is provided with the plurality of openings 34, (FIGS. 6-10) through which a cooling media 36, such as liquid nitrogen, is introduced. Filler pipes 38 are also used in connection with the openings 34 and although shown integral with the chamber, may be made detachable and thus are optional.

Spaced from the internal wall and positioned through inwardly extending stiffener rings 40 (two shown in FIG. 4) are a plurality of rotatable elongated tubular rods 42 which extend the length of the cylinder and are formed around the inner side and bottom of the chamber and around a portion of the bottom edge of the cylinder to form retaining arms 44 which cooperate with the shoulder 30 to clamp the ring 16 thereon. The retaining arms 44 extend only a part of the radial distance of the thickness of the sealing ring 16 so as not to interfere with the insertion of the sealing ring into the second part or capsule 20 with which it is to form a shrink fit. The rods 42 are also provided at their upper ends with handles 46 to rotate the rods and to hook onto a ring 48 on the upper end of the cylinder to clamp the sealing ring 16 onto the tool. Ring 48, affixed to the upper end of the tool, is also provided with three adjustable positioning bolts 50 (only one being shown) located about the ring 48 which provide a plane precisely controlled relative to the guiding shoulder 30 at the lower end of the tool. These positioning bolts precisely locate the sealing ring 16 in the capsule 20 since they engage the end 24 of the capsule when the tool is inserted into the capsule. These positioning bolts 50 may be torque painted to prevent changes in bolt position relative to shoulder 30.

Also spaced from the interior wall and positioned through the stiffener rings 40, is an elongated valve actuating rod 52 which extends the length of the cylinder and is connected via an extension 54 to a valve proper 56 which, in turn, is in communication with the chamber 32. The valve proper 56 is conical and seats, when closed, in opening 58. The valve actuating rod 52 is slidable relative to the cylinder and the valve is maintained in a chamber closing position by a spring 60. The valve is, of course, closed to retain the cooling media in the chamber 32 and is opened by the rod 52 against the bias of the spring 60 so that the cooling media may be drained therefrom. Finally, the chamber 32 is covered with an insulating foam 62 to aid in maintaining the chamber in its cooled condition and, in one embodiment, spheres 64 of a metal, such as steel, may be introduced into the chamber to provide an additional low temperature retaining time for the chamber. Also, to keep the spheres within the chamber when the valve is opened, a screen 66 is disposed across the valve opening 58. A thermocouple 70 may also be placed, in either embodiment, on the retaining arm 44 of the clamp and attached to a suitable display device, or thermometer, (not shown) to indicate the actual temperature and to provide a means for timing the reduction in temperature of the part 16.

In the operation of the tool and with reference to FIGS. 6-10, the ring 16 is installed over the reduced portion 28 and against the guiding shoulder 30 and clamped in place by rotation of the rotating arms 44 by handles 46 (FIG. 6). The valve 56, is, of course, closed by spring 60 at this time. Thereafter, the tool is immersed in the tank 16 shown schematically in phantom in FIG. 6 of cooling media to a depth so that the part 16 and the chamber 32 are fully immersed and the chamber is then filled with the cooling media which enters through the filler tubes 38 and openings 34 (FIG. 6). The sealing ring during this time shrinks on the tool as represented by the arrows.

After it has been determined that the ring 16 and the chamber 32 has reached the desired low temperature, the tool is removed from the tank with the chamber full of the cooling media. With the cooling media remaining adjacent the sealing ring in the torroidal chamber 32, the sealing ring 16 will remain in its shrunken condition outside the vat. The tool is then precisely positioned in the capsule 20 relative to end 24 of the capsule 20 utilizing positioning screws 50 (FIG. 7) and the cooling media is then removed by opening of the valve 56 so that the sealing ring 16 may be allowed to warm up and expand in place to form a shrink fit with the capsule 20 (FIG. 8). Thereafter, clamp rods 42 are rotated and arms 44 moved to free the ring 16 and the tool is removed as represented by the arrows in FIG. 8; this being feasible in view of the increase in the external diameter of the sealing ring upon increase in temperature thereof. At this time the sealing ring is shrunk fit in the capsule 20 (FIG. 9).

Finally, it should be pointed out that, as an example of shrink fit part, which may be used in practicing this invention, is a sealing ring with an ID 20 inches ±0.010 inches which will shrink 0.38 inches at approximately −320° F.

What is claimed is:

1. A tool for installing an annular hollow part into another in shrink fit relationship comprising,
   a body of dimensionally stable material,
   part locating means formed on said body,
   a chamber which may be filled with a cooling media located adjacent said part locating means,
   said body is in the form of a cylinder and wherein the chamber is in the form of a torus and located on an inside wall of said cylinder immediately adjacent the locating means, and
   clamping means for clamping a part onto said locating means, said chamber being capable of being filled with a cooling media to maintain the part at a desired low temperature while said part is installed in a second part and allowed to expand and form a shrink fit therewith.

2. The tool as claimed in claim 1 wherein said locating means comprises a reduced portion defined by an annular shoulder on the outside surface at one end of said cylinder with said chamber sharing the wall with said shoulder so that cooling media heat transfer is efficiently transferred therethrough.

3. The tool as claimed in claim 2 wherein said chamber is provided with means for filling said chamber when said tool is immersed in a tank of cooling media and wherein said tool is further provided with valve means for draining said cooling media from said chamber when said shrunken part is installed.

4. The tool as claimed in claim 3 wherein said chamber is also partially filled with metal spheres to aid in retaining the part at a desired low temperature during transfer from said tool to the other part.

5. The tool as claimed in claim 4 wherein said clamping means comprises rod means extending the length of said cylinder and provided with a retaining arm which engages said part to be shrunk at one end and engages the top of said cylinder at the other end.

6. The tool as claimed in claim 5 further including positioning means for engaging one end of the second part to precisely locate the first part in the second part.

7. The tool as claimed in claim 6 further including a thermocouple attached to said retaining arm to sense the temperature of said retaining arm and part.

* * * * *